Feb. 19, 1963   J. U. BROWN   3,077,950
CHECK-OUT COUNTER
Filed Oct. 19, 1961   8 Sheets-Sheet 1

INVENTOR
JEROME U. BROWN
BY
HIS ATTORNEYS

Feb. 19, 1963  J. U. BROWN  3,077,950
CHECK-OUT COUNTER
Filed Oct. 19, 1961  8 Sheets-Sheet 4

INVENTOR
JEROME U. BROWN
BY
*Louis A. Kline*
*Richard W. Lavin*
HIS ATTORNEYS

Feb. 19, 1963    J. U. BROWN    3,077,950
CHECK-OUT COUNTER
Filed Oct. 19, 1961    8 Sheets-Sheet 5

INVENTOR
JEROME U. BROWN
BY
HIS ATTORNEYS

Feb. 19, 1963 J. U. BROWN 3,077,950
CHECK-OUT COUNTER
Filed Oct. 19, 1961 8 Sheets-Sheet 6

INVENTOR
JEROME U. BROWN

BY
*Louis A. Kline*
*Richard W. Lavin*
HIS ATTORNEYS

Feb. 19, 1963  J. U. BROWN  3,077,950
CHECK-OUT COUNTER
Filed Oct. 19, 1961  8 Sheets-Sheet 7

INVENTOR
JEROME U. BROWN
BY
*Louis A. Kline*
*Richard W. Davis*
HIS ATTORNEYS

United States Patent Office 3,077,950
Patented Feb. 19, 1963

3,077,950
CHECK-OUT COUNTER
Jerome U. Brown, Dayton, Ohio, assignor to The National Cash Register Company, Dayton, Ohio, a corporation of Maryland
Filed Oct. 19, 1961, Ser. No. 146,269
16 Claims. (Cl. 186—1)

This invention relates to a checkout counter, and more particularly relates to a mechanism for transporting and feeding cartons onto the loading section of a checkout counter, where they are used as carrying means for the goods purchased by the customer.

In the present-day operations of super-markets, there is a great demand for an increase in speed in processing customers through the checkout counters. It has been found that one cause of the present slow-down through such counters has been the time required to package the items purchased, after payment by the customer. It is, therefore, an object of this invention to provide a check-out counter which has means for automatically supplying and positioning a carton on the counter, whereby the operator at the counter may load the carton with each item of merchandise as it is checked out.

It is another object of this invention to provide a mechanism which feeds a carton from a stack of cartons onto a checkout counter during the first part of an operating cycle, and which positions another carton for a feeding operation during the second part of the operating cycle.

It is a further object of this invention to provide mechanisms for transporting a stack of cartons from a supply position to a position whence the cartons may be fed onto the loading section of a checkout counter.

It is still another object of this invention to provide controls operated by the operator for feeding and positioning the cartons during a checkout operation.

A further object of this invention is to provide a movable platform on which the cartons are stacked, and a plurality of switches operated by the movement of the platform to sequentially condition control means, by means of which the operator is able to replenish the supply of cartons.

It is a further object of this invention to provide a mechanism for loading a stack of cartons onto a supporting platform.

With these and incidental objects in view, the invention includes certain novel features of construction and combinations of parts, the preferred form or embodiment of which is hereinafter described with reference to the drawings which accompany and form a part of this specification.

Figure 1:
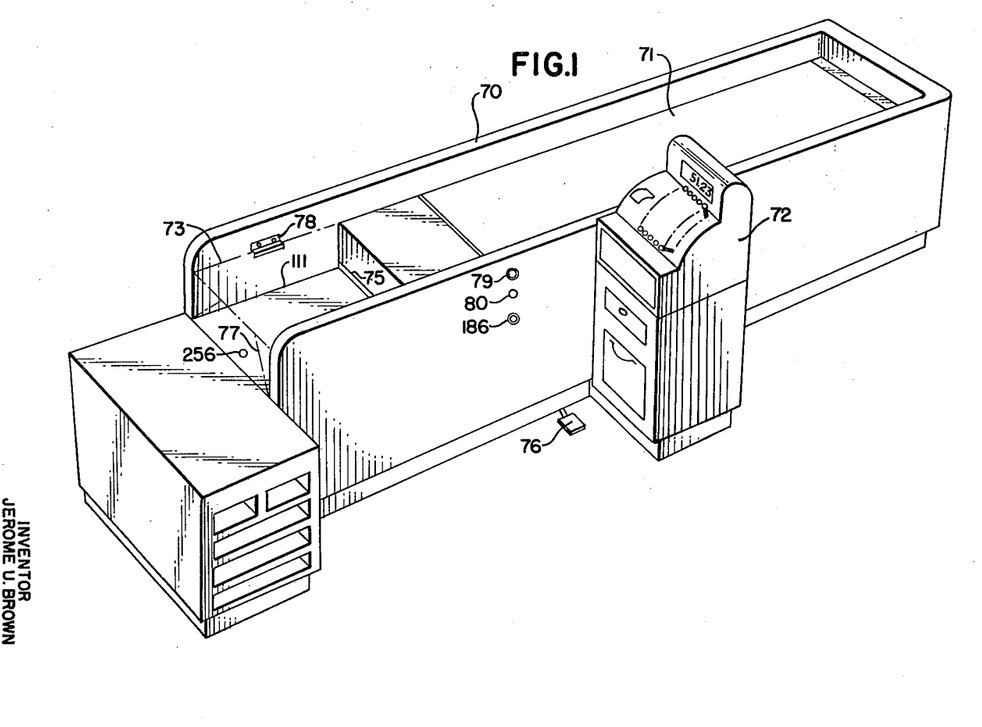
FIG. 1 is a general layout of the checkout counter, including a carton, shown in dotted lines, in the loading position, after it has been fed from the inside of the checkout counter, and of the control means for feeding a stack of cartons onto the feeding platform, for moving a plurality of stacks of cartons to an operating position within the counter, and for feeding a carton onto the counter.

Referring now to the drawings, wherein a preferred embodiment of the present invention is shown, FIG. 1 discloses a typical checkout counter 70, having a moving belt 71 (FIG. 3) for transporting the merchandise items to the checkout section, located towards the back of the counter. Associated with the checkout counter is a cash register 72, located adjacent the operator's position. At the rear of the checkout counter is a recessed portion, in which is shown, in phantom lines, a loading carton 73. The carton is shown in the open position, where it may be loaded with merchandise items as they are checked out by the operator. At the lower front edge of the recessed portion is a slot 75, through which the cartons are fed from inside the counter onto the lower surface 111 of the recessed portion of the checkout counter.

Located at the bottom of the counter, adjacent the operator's position, is a pedal 76 (FIG. 1), which, when operated by the operator, controls a feeding mechanism to feed a carton through the slot 75 onto the recessed portion of the checkout counter. The carton 73 is of a type having four sides, two sides of which have two forty-five-degree diagonal folds 77, thereby enabling the carton to be folded and to assume a flat compact arrangement, which is suitable for storage. The cartons are stacked into a prearranged pile and positioned within the checkout counter in a manner explained hereinafter.

As each carton is fed onto the recessed portion of the counter, the operator unfolds the carton and inserts the opposite sides under the two opposing retaining clips 78, located on the inside walls of the checkout counter, to facilitate the loading of the merchandise items into the carton. It is seen from this arrangement that the operator can check out each merchandise item and deposit the item into the carton without the necessity of leaving the cash register. As soon as the checkout operation is complete, the carton is ready to be taken by the customer.

Also located on the side of the checkout counter adjacent the operator's position are a button 80 and two warning lights 79 and 186 (FIG. 1). When the light 186 flashes, a new supply of cartons is needed. By depression of the button 80, a new supply of cartons is so positioned that operation of the pedal 76 feeds a carton onto the counter. The checkout counter contains a supply of cartons which are stacked as described above. When the last stack of cartons is being fed onto the counter, the light 79 flashes. This warns the operator that a new supply of cartons is needed within the counter. In the loading of these stacks of cartons, as will be described hereinafter, a door located at the front of the counter is opened. A switch located inside the counter door is depressed with the loading of each additional new stack to control the transporting of the new stacks from the front of the counter to the rear of the counter, where the carton-feeder mechanism is located. Thus the feeding and the positioning of the cartons are automatically controlled by the counter operator, and the replenishment of the supply is controlled by the service personnel.

Figure 2:
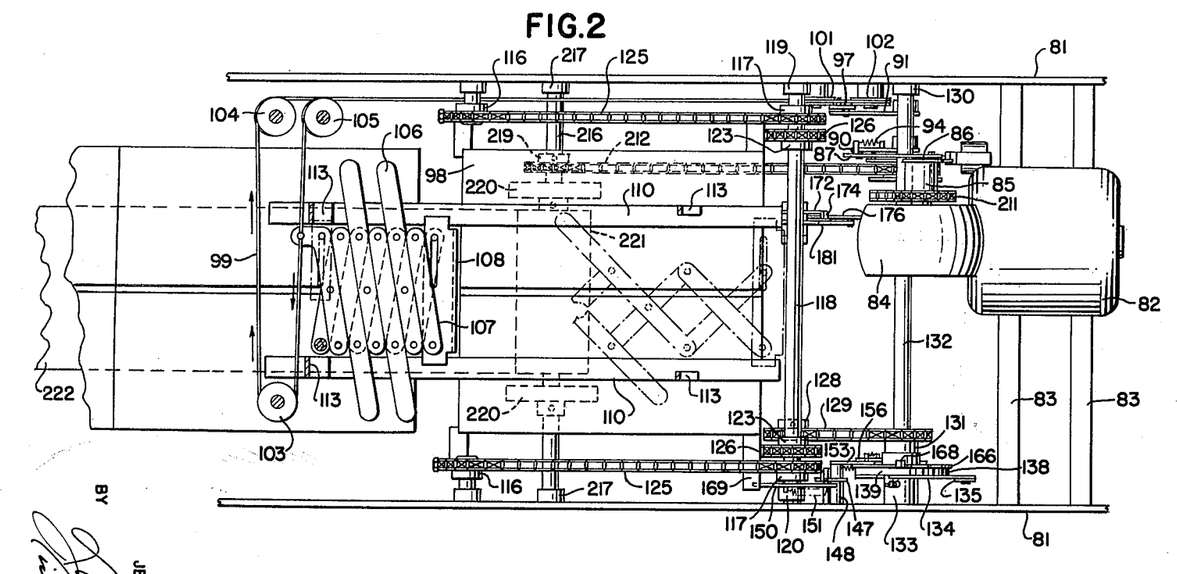
FIG. 2 is a top view of the mechanism for feeding and positioning the cartons during a checkout operation.
Figure 3:
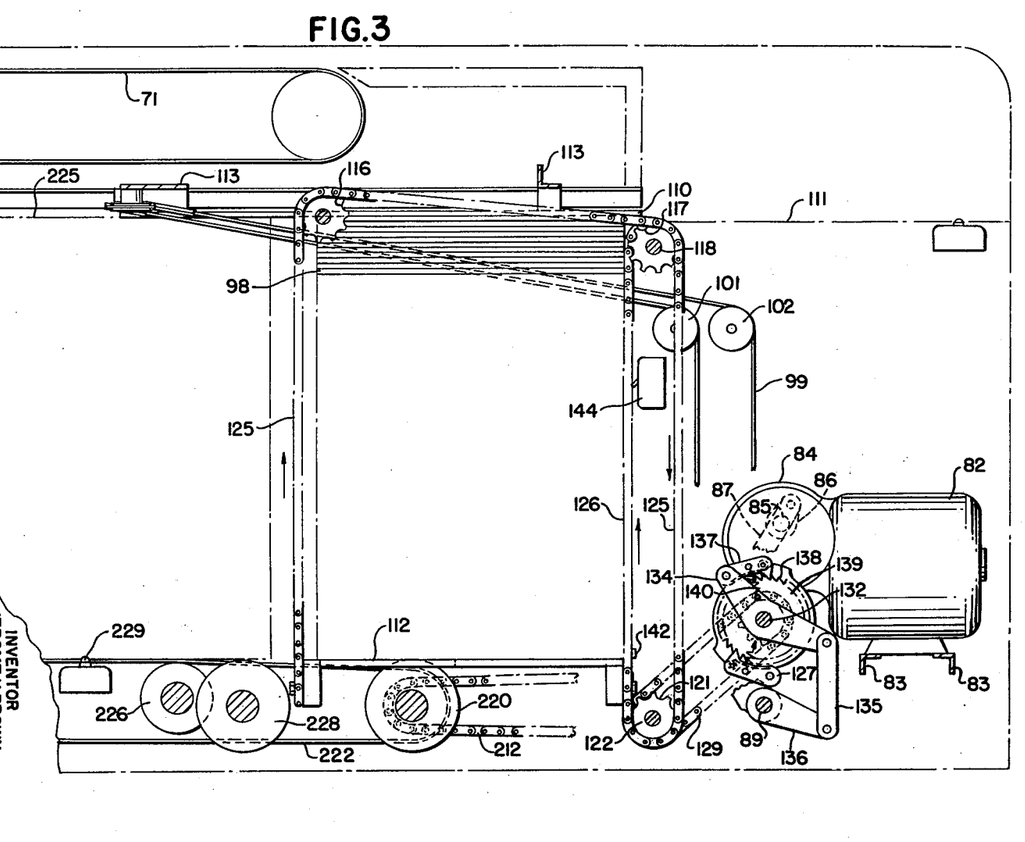
FIG. 3 is a partial side view of the feeding mechanism, showing the mechanism for raising the feeding platform to position a carton in a feeding position and part of the belt system for transporting a stack of cartons onto the feeding platform.
Figures 4, 5:
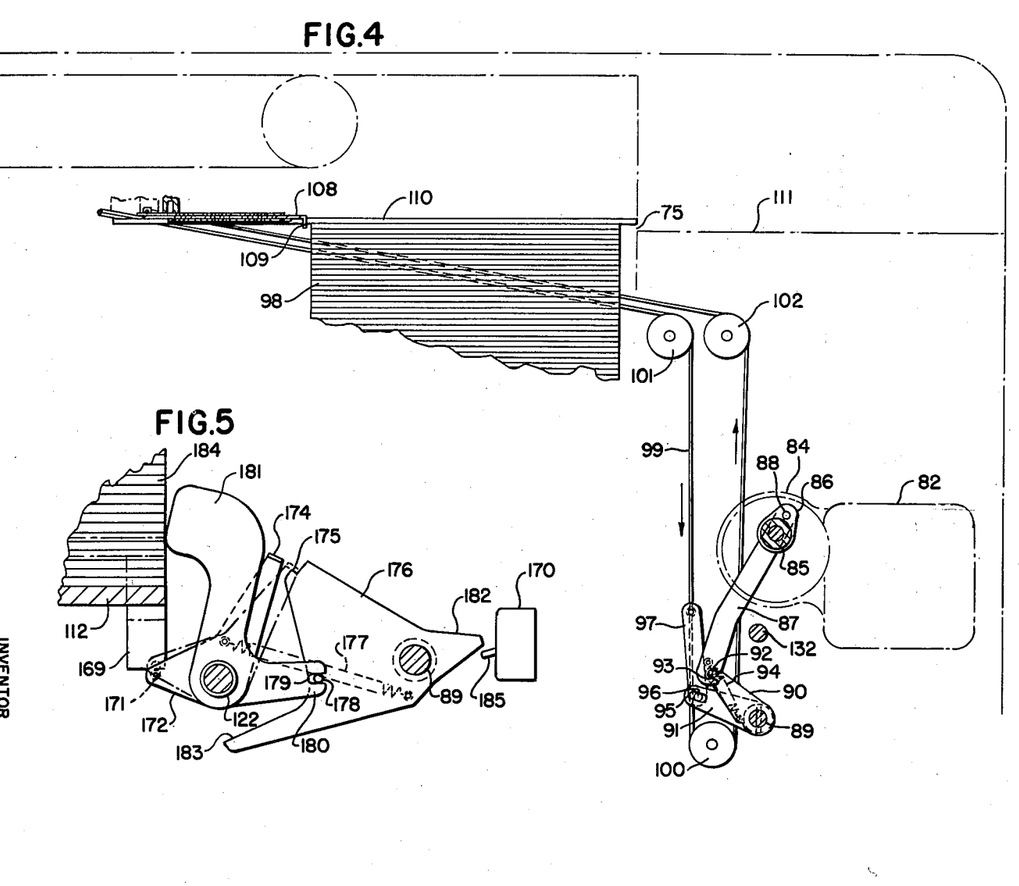
FIG. 4 is a partial side view of the carton-feeding mechanism.
FIG. 5 is a detail side view showing the switch-actuating mechanism which is operated when the feeding platform is empty.

Referring now to FIGS. 2, 3, 4, and 8, there are shown in detail the major components which constitute the carton-feeding mechanism. Located within the checkout counter is a motor 82 (FIGS. 3 and 4), mounted on two angle frames 83, each frame supported between the sides 81 of the checkout counter. A gear reduction box 84, mounted on the front of the motor 82, drives an offset shaft 85 at a speed of twenty-four revolutions per minute during the time the motor is energized for operation. Secured to the shaft 85 is an arm 86 (FIG. 4), on which is rotatably mounted, by means of a stud 88, a link 87. Located beneath the gear reduction box 84 is a shaft 89, rotatably supported between the sides of the checkout counter. Pinned to the shaft are arms 90 and 91. The arm 90 has mounted on its end a stud 92 (FIG. 8), which is normally positioned within a slot 93 in the link 87. A spring 94, mounted between a stud located on the link 87 and a stud located on the arm 90, normally urges the stud 92 into engagement with the slot 93. Operation of the carton feed pedal 76 by the operator completes an energizing circuit to the motor 82, to be described more fully hereinafter, which results in the driving of the shaft 85 one clockwise revolution. During the first half of the revolution, the link 87 rocks the shaft 89 and the arm 91 counter-clockwise. As shown in FIG. 4, the arm 91 has a slot 95 located at its end. Slidably located within this slot is a stud 96 (FIG. 8), mounted on a link 97. Clamping the stud 96 in either the short end or the long end of the slot 95 effectively gives an adjustable feeding stroke to the link 97. The link 97 is attached to one segment of a belt system, which is composed of a belt 99, pulleys 100, 101, and 102 (FIG. 4), and pulleys 103, 104, and 105 (FIG. 2). Each of the pulleys is rotatably mounted on the framework of the checkout counter. Also attached to the belt 99 is one segment of a scissors actuator 106 (FIG. 2), positioned beneath the top edge of the checkout counter. The actuator 106 is composed of a series of segments 107, each pivoted at its ends, so that, when actuated in a manner well known in the art, they expand in a horizontal direction. Attached to the front of the actuator is a frame member 108, having a depending flange portion 109 (FIG. 4). The frame member 108 is supported for movement by two guide members 110 (FIG. 2) located beneath the top edge of the checkout counter. Each guide member is supported by two L-shaped members 113, mounted on the sides of the checkout counter. As shown in FIGS. 3 and 4, the end of a guide member, together with portions of the checkout counter, defines the slot 75, through which the cartons are fed onto the surface 111 of the checkout counter.

Positioned adjacent the frame member 108 is a stack of cartons 98 (FIG. 3), located on a feeding platform 112. The flanged portion 109 of the frame member is positioned adjacent the top carton of the stack 98. Upon the counter-clockwise movement of the arm 91, as described above, the belt 99 is driven by the link 97 in the direction shown by the arrows in FIG. 4. This movement is transmitted to the scissors actuator 106, which moves the frame member 108 towards the slot 75 to a position shown in dotted lines in FIG. 2. As the frame member moves along the guide members 110, the top carton of the stack 98 is engaged and fed onto the surface 111, where it is opened by the operator and filled with the customer's purchased items.

During the second part of the drive revolution of the motor 82, the link 87 rocks the shaft 89 and the arm 91 clockwise, which results in the scissors actuator 106 being returned to its closed position. As this is occurring, the platform 112 is moved upward to position a carton for the next feeding operation, in a manner to be described presently.

Referring to FIG. 3, there is shown positioned at the bottom of the checkout counter the feeding platform 112, on which is located the stack of cartons 98. Associated with the platform are a number of sets of sprocket wheels, by which the platform is controlled so as to position a carton adjacent the flanged portion 109 of the scissors actuator 106, as previously described. One set of sprocket wheels 116 (FIG. 3) is rotatably mounted on the side frame 81, as shown in FIG. 2. Another set of sprocket wheels 117 is pinned to a shaft 118, which is journaled in bearings 119 and 120 (FIG. 2), located on the side frames 81. Positioned at the bottom of the counter are the sprocket wheels 121, pinned to a shaft 122 mounted in a manner similar to the shaft 118. Also mounted on the shafts 118 and 122, inboard of the sprocket wheels 117 and 121, are the sprocket wheels 123 and 124, respectively. Associated with these sprocket wheels are a series of drive chains for controlling the movement of the platform 112. Only one side will be described in the description of the drive chains, since the same arrangement exists on the other side of the platform.

As may be best seen in FIG. 3, there is shown a drive chain 125, having one end attached to the front portion of the platform 112, and extending over the sprocket wheels 116, 117, and 121, to the rear portion of the platform, where the other end of the chain drive is attached. Mounted on the inboard sprocket wheels 123 and 124 is a drive chain 126, which is attached to the platform 112. This arrangement prevents the platform 112 from twisting during its movement. Also mounted on the shaft 122 inboard of the sprocket wheel 124 is a sprocket wheel 128 (FIG. 2). Associated with the sprocket wheel 128 is a drive chain 129 (FIGS. 2 and 3), which engages a sprocket wheel 131, pinned to a shaft 132, mounted between the side frames of the checkout counter in bearings 130 and 133 (FIG. 2). Rotatably supported by the shaft 132 is a bell crank 134 (FIG. 3). A link 135, mounted on one end of the bell crank 134, is connected to a lever 136, which is pinned to the shaft 89. The other end of the bell crank 134 has rotatably mounted thereon a ratchet pawl 137, which coacts with a series of teeth 138 on a ratchet wheel 139, pinned to the shaft 132. A spring 140, mounted between the ratchet pawl 137 and the bell crank 134, urges the ratchet pawl into engagement with the ratchet teeth. A second ratchet pawl 127, mounted on the side of the checkout counter below the ratchet wheel 139, is spring-urged into engagement with the ratchet wheel 139 to act as a back-up retainer for the wheel.

As previously explained, operation of the motor 82 drives the link 87 (FIG. 4) through one revolution during each feeding cycle. During the first half of the revolution, the shaft 89 is rocked counter-clockwise, which, by means of the link 135 and the lever 136, rocks the bell crank 134 counter-clockwise. As may be seen from FIG. 3, this movement rotates the ratchet pawl 137 into engagement with the next ratchet tooth. During the second half of the drive revolution, the link 87 rocks the shaft 89 and the bell crank 134 clockwise. This rocking of the bell crank is transmitted to the ratchet wheel 139 by the ratchet pawl 137, resulting in the shaft 132 being turned clockwise. Clockwise turning of the shaft 132 rotates the sprocket wheel 131, which, by means of the drive chain 129 and the sprocket wheel 128, turns the shaft 122 clockwise. Since the sprocket wheels 121 and 124 are also mounted on the shaft 122, the turning of the shaft 122 actuates the drive chains 125 and 126 in a direction indicated by the arrows in FIG. 3, resulting in upward movement of the platform 112. This movement of the platform locates the top carton of the stack 98 in a position to be engaged by the flange portion 109 of the scissors actuator 106 during a subsequent operation of the motor 82. Thus one revolution of the motor 82 results in the feeding of the carton onto the checkout counter and the positioning of the next carton in a feeding position.

As the operation of the carton-feeding mechanism continues, the platform is successively moved toward the top of the counter. As the platform reaches a distance of approximately three quarters of its total travel, a stop 142 (FIG. 3), mounted on the drive chain 126, engages a switch 144, which, as will be described hereinafter, conditions a circuit to the low stack warning light 79 (FIG. 1). This energization of the warning light 79 occurs only when the stack of cartons on the platform is the last stack in the checkout counter. If the checkout counter still has a supply of stacks of cartons, the circuit to the light 79 is not energized.

There will now be described the mechanism for returning the feeding platform 112 to its home position after the last carton has been fed onto the counter. When the platform reaches a position such that only two cartons are left in the stack, a stop 145 (FIG. 6), mounted on the drive chain 125, is positioned adjacent the finger 146 of a bell crank 147, mounted for rotation on a stud 148, supported by the side frames 81 of the checkout counter. During the feeding of the next-to-the-last carton when the platform is moved to position the last carton adjacent the flange portion 109 of the scissors actuator 106, the stop 145 engages the finger 146, thereby rocking the bell crank 147 counter-clockwise. This allows a stud 149, mounted on the lower end of the bell crank, to be moved from beneath the edge of one end of a lever 150, rotatably mounted on the shaft 122. A spring 151, mounted between the bell crank 147 and the lever 150, rotates the lever clockwise upon the withdrawal of the stud 149. A lip portion 152 of the lever 150 limits this movement of the lever by engaging the stud 149.

Figure 6:
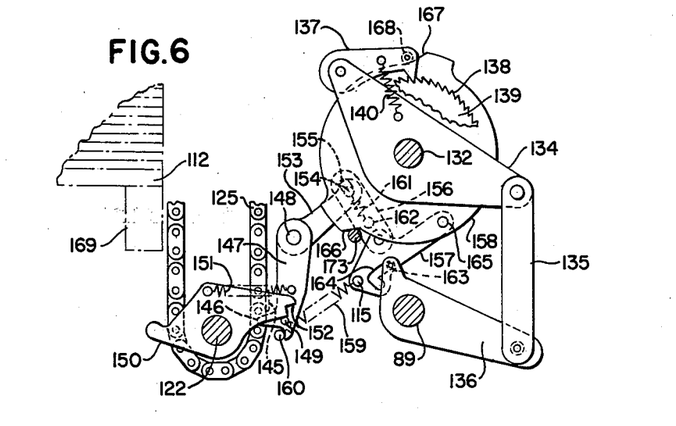
FIG. 6 is a detail view of the mechanism for releasing and feeding the platform after the last carton has been fed.

Mounted on an end portion 153 of the bell crank 147 is a stud 154. The stud is positioned within a slot 155, located at one end of a link 156. The other end of the link 156 is rotatably mounted on an arm 157. As shown in FIG. 6, the arm 157 has one end rotatably attached, by means of a stud 165, to a plate 158, which in turn is rotatably mounted on the shaft 132. The other end of the arm 157 has mounted thereon a stud 115, to which is attached one end of a spring 159, the other end of which is attached to a stud 160, mounted on the side frame 81 of the checkout counter. When the bell crank 147 is rocked counter-clockwise as the result of the platform's reaching its highest point of travel, the stud 154 moves within the elongated slot 155. A spring 161, mounted between the stud 154 and a stud 162, located on the link 156, is tensioned as the result of this movement, because the link 156 is prevented from moving due to the engagement of the arm 157 by the lever 136, as shown in FIG. 6. This results from the positioning of a stud 163, located at one end of the lever 136, within an L-shaped slot 164 in the arm 157. Upon the feeding of the last carton on the platform, which occurs during the first half of the drive revolution, the shaft 89 is rocked counter-clockwise, as previously described. This rocks the lever 136 counter-clockwise, which positions the stud 163 in the left-hand portion of the L-shaped slot 164, thereby releasing the arm 157 for clockwise movement about the stud 165 under the urging of the spring 161. When this occurs, the stud 163 is positioned in the lower portion of the slot 164. During the second half of the drive revolution of the motor 82, when the feeding platform 112 is raised, the shaft 89 is rocked clockwise. This rocking of the shaft 89 releases the platform 112 for movement to its home position in the following manner.

As was previously described, the arm 157 is rotatably mounted by means of the stud 165 to the plate 158, which in turn is rotatably supported on the shaft 132. The plate 158 has two cam surfaces, 166 and 167 (FIG. 6). The cam surface 167 is positioned adjacent a stud 168, located on the ratchet pawl 137, while the cam surface 166 is positioned adjacent a similar stud 173, located on the lower ratchet pawl 127 (FIG. 3). Upon the clockwise movement of the shaft 89, the lever 136 is rocked clockwise, resulting in the counter-clockwise movement of the arm 157 due to the positioning of the stud 163 within the lower portion of the slot 164. This turns the plate 158 counter-clockwise, as viewed in FIG. 6, resulting in the cam surfaces 166 and 167 engaging and rotating the ratchet pawls 127 and 137 out of engagement with the ratchet wheel 139. This releases the platform 112 and allows it to return to its home position by gravity. As the platform nears its home position, a support 169 (FIG. 6), secured to the platform, engages the lever 150 and rocks it counter-clockwise, thereby disengaging the stud 149 from the lip portion 152 of the lever 150. When this occurs, the bell crank 147 is rocked clockwise under the action of the spring 151, resulting in the stud 154 camming the link 156 downwardly. This movement of the link forces the arm 157 to rotate counter-clockwise about the stud 165, thereby positioning the stud 163 of the lever 136 in the upper part of the slot 164. This releases the arm 157 to be moved under the action of the spring 159 in a direction which turns the plate 158 clockwise. Upon the clockwise movement of the plate 158, the cam surfaces 166 and 167 release the ratchet pawls 127 and 137, which, due to the action of their springs, rotate the ratchet pawls into engagement with the ratchet wheel 139, thereby holding the platform 112 in its home position. With this arrangement, the platform is automatically returned to its home position after all the cartons have been fed. As will be described below, this position allows another stack of cartons to be loaded onto the platform.

To condition certain controls so that they may be actuated by the operator to feed a new stack of cartons onto the empty platform, a switch 170 (FIG. 5) must be operated. The function of this switch will be described more fully in the description of the electrical circuit. As shown in FIG. 5, the lower support 169 of the platform 112 engages a stud 171 when the platform has returned to its home position as described above. The stud 171 is mounted on one end of a bell crank 172, which in turn is rotatably supported on the shaft 122. A flange 174, located on the other end of the bell crank 172, is rocked counter-clockwise as the result of the engagement of the platform support 169 with the stud 171. This movement disengages the flange from the lip portion 175 of a lever 176, rotatably supported on the shaft 89. A spring 177, mounted between the bell crank 172 and the lever 176, urges the lever clockwise upon the rocking of the flange 174. A stud 178, mounted on the lever 176, is positioned within a slot 179, located at one end of a bell crank 180, rotatably supported on the shaft 122. From this arrangement it is seen that, upon the clockwise movement of the lever 176, the bell crank 180 is rocked counter-clockwise to position a feeler portion 181 above the empty platform, as shown in FIG. 5. Clockwise movement of the lever 176 also closes the switch 170, which conditions control circuits for loading a new stack of cartons onto the empty platform. The closing of the switch 170 is accomplished by the engagement of the switch blade 185 of the switch 170 by a finger 182 of the lever 176. The clockwise movement of the lever 176 continues until a lower finger 183 of the lever engages the hub portion of the bell crank 180. The switch 170 remains closed until a new stack of cartons 184 (FIG. 5) is loaded onto the platform 112. As the stack of cartons 184 is loaded onto the platform, it engages the feeler portion 181 of the bell crank 180 and moves it clockwise, which rocks the lever 176 counter-clockwise, thereby disengaging the switch 170. The bell crank 172 is moved to the position shown in the dotted lines of FIG. 5 under the action of the spring 177 and latches the lip portion 175 with the flange 174 when the platform 112 is raised, thereby permitting the support 169 to be free of the stud 171. Thus the movement of the platform to its home position automatically conditions certain control circuits, which facilitate the loading of a new stack of cartons onto the platform. The mechanism for controlling this latter operation will now be described.

Figures 7, 14:
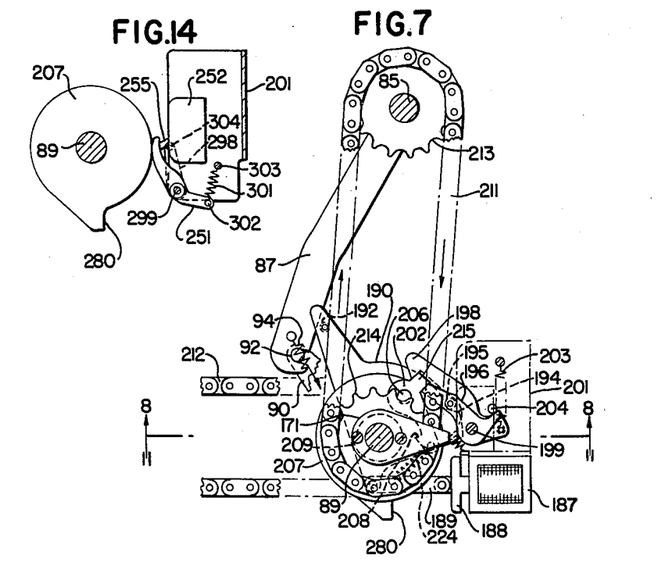
FIG. 7 is a detail view of the motor drive for driving the mechanism to feed a stack of cartons onto the feeding platform and to transport a number of stacks of cartons into the counter.
FIG. 14 is a side detailed view of the switch actuated by the belt drive during the transporting of a stack of cartons within the counter.

The closing of the swtich 170 by the platform 112 also completes a circuit to a lamp 186, located on the side of the checkout counter, as shown in FIG. 1. The function of this lamp is to warn the operator that the platform is empty and that a new stack of cartons should be loaded thereon. To initiate a carton-loading operation, the operator pushes the button 80 (FIG. 1), thereby operating a relay and a series of switches which will be described more fully hereinafter. One of the switches completes an energizing circuit to a solenoid 187 (FIGS. 7 and 11), supported on a lower portion of the checkout counter. As shown more clearly in FIG. 11, the solenoid 187 has a plunger 188, to which is attached one end of a link 189. The other end of the link 189 is rotatably attached, by means of a stud 197 (FIG. 8), to a disengaging lever 190, rotatably supported on the shaft 89. The disengaging lever has a finger portion 191, to which is mounted a stud 192, which, as shown in FIG. 7, is positioned adjacent the link 87. Energization of the solenoid 187 pulls the plunger 188, thereby rocking the disengaging lever counter-clockwise about the shaft 89. When this occurs, the stud 192 also is rocked counter-clockwise to engage the link 87 and rock it clockwise about the stud 88 in the arm 86, as shown in FIG. 4. This lifting movement of the link disengages the link, against the actuation of the spring 94, from the stud 92, located on the arm 90, thereby disabling the arm 90 from rocking the shaft 89 and actuating the scissors actuator 106 upon the operation of the motor 82, as previously described. The disengaging lever has, on its peripheral edge, a cam surface 194 (FIG. 11), which normally is positioned adjacent a stud 195 (FIG. 7), mounted on a stop arm 196. The stop arm 196 is rotatably supported by a stud 199, secured to a support member 201, mounted on the frame of the checkout counter. Also rotatably mounted on the stud 199 is a latch arm 198. One end of the latch arm 198 is engaged by a spring 203, the other end of which is attached to the support member 201. The spring 203 normally urges the latch arm 198 counter-clockwise about the stud 199. A stop 204, mounted on the support member 201, limits the movement of the latch arm 198 in this direction.

Figure 8:
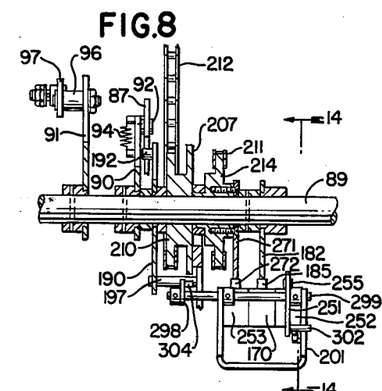
FIG. 8 is a detail sectional view, taken on line 8—8 of FIG. 7, showing the various control switches and the drive mechanism for feeding a stack of cartons onto the feeding platform and into the checkout counter.
Figure 11:
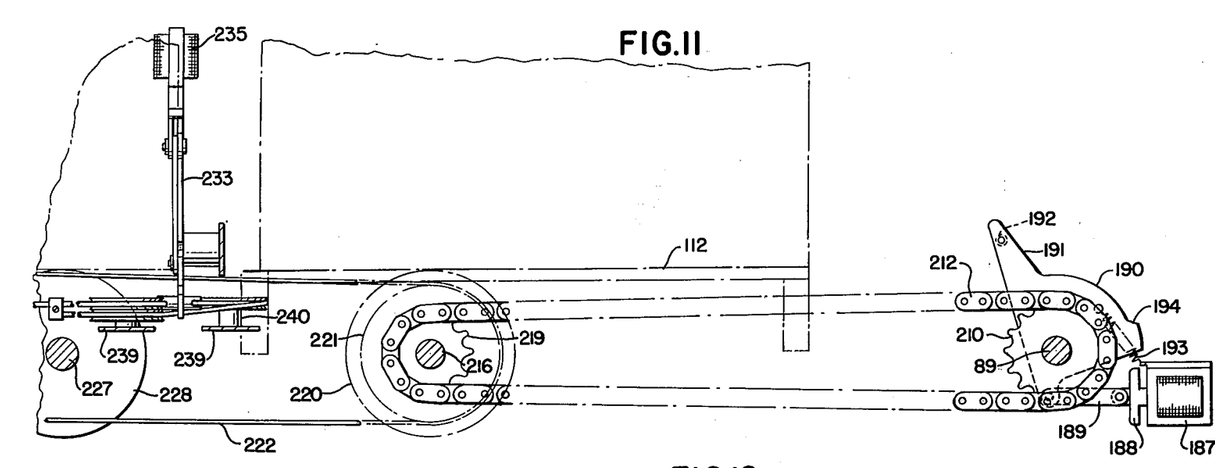
FIG. 11 is a side detail view of the mechanism for transporting the stacks of cartons onto the feeding platform, and includes a partial detail view of the control gates.

Associated with the stop arm 196 and the latch arm 198 is a ratchet pawl 202, rotatably mounted on a stud 206, which is secured to a plate 207 (FIG. 7). The pawl 202 has a projection 215, which normally is engaged by the stop arm and the latch arm. The plate 207 is rotatably mounted on the shaft 89 and has a flanged end, which comprises a sprocket wheel 210 (FIG. 8), to which is attached a drive chain 212 (FIGS. 7, 8, and 11). Energization of the solenoid 187 rocks the disengaging lever 190 counter-clockwise against the urging of a spring 193 (FIG. 11), which is mounted between the lever 190 and the solenoid support member. This allows the cam surface 194 of the disengaging lever to engage the stud 195, thereby rocking the stud and the stop arm 196 clockwise about the stud 199. Rotation of the stud 195 also engages the lower edge of the latch arm 198, rotating the arm in a similar direction against the urging of the spring 203. Upon the rotation of the stop arm and the latch arm, the projection 215 of the ratchet pawl 202 is disengaged from both of these arms. When this occurs, a spring 224 (FIG. 7), mounted between the ratchet pawl 202 and the plate 207, rotates the ratchet pawl clockwise about the stud 206. This positions a hooked portion 208 of the ratchet pawl in the path of a ratchet tooth member 209, secured to a sprocket wheel 214 (FIGS. 7, 8, and 11), rotatably mounted on the shaft 89. Coacting with the sprocket wheel 214 is a drive chain 211, which is connected to a second sprocket wheel 213 (FIG. 7), mounted on the motor drive shaft 85. Operation of the motor 82 drives the sprocket wheel 214 clockwise (FIG. 7) by means of the sprocket wheel 213 and the chain drive 211. This rotation of the sprocket wheel 214 results in the engagement of the ratchet member 209 with the hooked portion 208 of the ratchet pawl 202. Engagement of the ratchet pawl by the ratchet member 209 couples the plate 207 to the operation of the sprocket wheel 214. Rotation of the plate 207 results in the operation of the sprocket wheel 210 (FIG. 11), which drives the drive chain 212 in the direction shown. The drive chain 212 is connected to a sprocket wheel 219, pinned to a shaft 216, which is rotatably supported in bearings 217 (FIG. 2), mounted on the side frames 81 of the checkout counter. From this arrangement it is seen that operation of the motor rotates the shaft 216 upon the energization of the solenoid 187.

Figure 12:
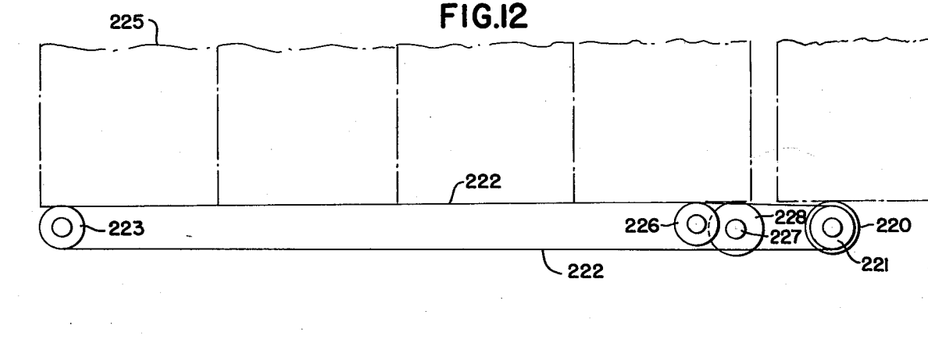
FIG. 12 is a schematic diagram showing a number of stacks of cartons accommodated within the counter, and the means for transporting the stacks of cartons to the feeding platform.

Also mounted on the shaft 216 are rollers 220 and 221 (FIGS. 11 and 12). Referring to FIG. 2, it is seen that the roller 221 engages and drives a wide flat rubber belt 222, while the rollers 220 are positioned on either side of the belt. Associated wtih the belt 222 is a takeup roller 223, similar in construction to the roller 221 and rotatably mounted at the front of the checkout counter (FIG. 12). Supported on the belt 222 are a number of stacks of cartons 225. Located intermediate the positions of the drive roller 221 and the takeup roller 223 is a support roller 226. From this arrangement, it is seen that, upon clockwise operation of the drive roller, the belt 222 is driven in a similar direction, resulting in the movement of the stacks of cartons 225 towards the platform 112.

Rotatably supported by a shaft 227 and positioned adjacent the roller 226 and the belt 222 are rollers 228, having a diameter equal to that of the rollers 220. During the operation of the belt 222, a stack of cartons is positioned adjacent the platform 112 and move onto the rollers 228, as shown in FIG. 12. On a subsequent operation of the belt 222, the stack of cartons engages the rollers 220, which, due to their having a larger diameter than the roller 221, transport the stack of cartons at a faster rate than that of the belt 222. As the stack of cartons continues its forward movement, it leaves the belt 222 and is supported solely by the rollers 228 and 220, which then position the stack of cartons onto the platform 112. Since the speed of the rollers 220 is greater than that of the belt 222, a gap forms between the stack of cartons on the platform and the next stack of cartons on the belt, as shown in FIG. 12. By this arrangement, a stack of cartons is fed onto the feeding platform in such a manner that the following stack of cartons is so positioned as not to interfere with the upward movement of the feeding platform.

As the motor 82 completes the first revolution of travel, the original energizing circuit is still effective to initiate the second revolution of travel. During the second revolution of the motor, switching means, to be described hereinafter, and controlled by the positioning of the sprocket wheel 214, are operated to de-energize the solenoid 187. When this occurs, the disengaging lever 190 is rocked clockwise under the action of the spring 193 (FIG. 11). This removes the cam surface 194 from engagement with the stud 195, thereby allowing the stop arm 196 and the latch arm 198 to be rotated counter-clockwise about the stud 199 under the action of the spring 203 (FIG. 7) to their home position. As the ratchet pawl 202 completes the first revolution of its travel, the projection 215 of the ratchet pawl engages the stop arm 196, thereby rocking the ratchet pawl counter-clockwise about the stud 206 against the action of the spring 224. This disengages the pawl from the tooth 209, allowing the pawl to be positioned in its original position. At this time, the latch arm 198 latches over the projection 215 of the ratchet pawl, as shown in FIG. 7. The motor 82 is still energized, which allows the tooth 209, which was disengaged from the ratchet pawl at approximately 180 degrees from its home position, to be returned to its home position, as shown in FIG. 7. At the end of its second revolution, the motor is de-energized by the opening of switches to be described hereinafter. The clockwise rotation of the disengaging lever 190, upon the de-energization of the solenoid 187, also removes the stud 192 from engagement with the link 87, allowing the link to engage the stud 92 on the arm 90 at the end of the second revolution of operation of the motor 82. This conditions the link 87 to rock the shaft 89 during a subsequent energization of the motor 82, which results in the feeding of a carton onto the checkout counter, as previously described. It will be seen from this description that the mechanism described will automatically, when energized, position a new stack of cartons on the feeding platform and conditions the carton-feeding mechanism for a subsequent operation.

When the last stack of cartons 225 (FIG. 12) is loaded onto the platform 112 as described previously, operation of the carton-feeding mechanism raises the feeding platform towards the top of the counter. Referring to FIG. 3, there is shown, located along the belt 222, a button 229, supported by the side frame of the checkout counter. Movement of the last stack of cartons onto the platform 112 releases the button 229 to close a switch in a circuit to be described hereinafter, which conditions the lamp 79 (FIG. 1) to be lighted. This lighting of the lamp 79 occurs during the feeding of the cartons from the last stack when the platform 112 trips the switch 144 (FIG. 3), as previously described. The lamp 79, when lighted, gives notice to the operator that a new supply of cartons is required to be positioned within the checkout counter.

As shown in FIG. 12, the checkout counter has a capacity to accommodate five stacks of cartons. More or less would require a longer or shorter counter length. At the front of the checkout counter is a door 230 (FIG. 9), which, when opened, allows the stacks of cartons to be inserted into the counter. To facilitate the movement of the stack of cartons within the counter, a button 231 (FIG. 9) is located on the inside of the checkout counter adjacent the door 230. Depression of the button 231 results in the operation of the belt 222 as described above. Each time the button 231 is depressed, the belt 222 transports a stack of cartons a distance equal to the length of the stack. With this arrangement, the operator need only position a stack of cartons at the front of the belt, and, upon depression of the button 231, the stack of cartons is transported towards the platform 112 until the counter is filled, as shown in FIG. 12. Also controlled by the button 231 are two gates 233 (FIGS. 9, 10, and 11), which, when operated, swing out against the action of a detent 232, mounted on the side frame of the counter, to a blocking position as shown by the dotted lines in FIG. 10. The function of these gates is to prevent a stack of cartons from being moved towards the platform 112 during a loading operation when the platform is not in a loading position.

Figure 10:
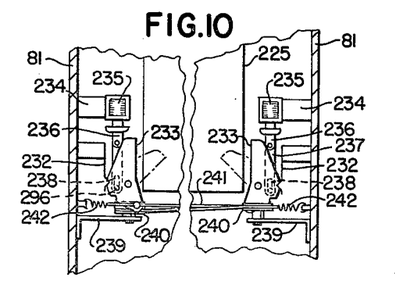
FIG. 10 is a side sectional view of the mechanism shown in FIG. 9, disclosing the various positions of the control gates and the solenoids for actuating the control gates.

As shown in FIG. 10, there is secured to the side frames 81 of the checkout counter a pair of brackets 234, each supporting a solenoid 235. Each solenoid has a plunger 236, to which is attached a link 237, the other end of which is slidably mounted on the gate 233 by means of a stud 296. Energization of the solenoid 235 actuates its plunger in a downward direction. If at this time the gates are in a closed position, this downward movement of the plunger rotates the gates to an open position. If the gates are already in an open position, the stud 296 rides in a slot 238 in the link 237, allowing the gates to remain in their open position.

Figure 9:
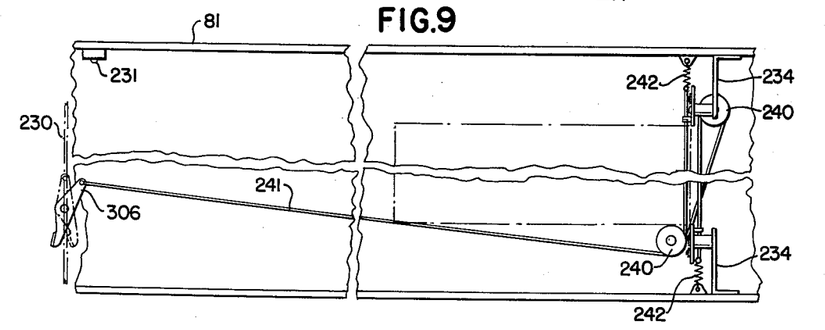
FIG. 9 is a top view of the front part of the counter, showing an arrangement controlled by the opening of the rear door for operating control gates to facilitate the positioning of a plurality of new stacks of cartons.

Associated with each of the gates 233 is a belt and pulley system, as shown in FIG. 9. Mounted on brackets 239 (FIG. 10), secured to the side frames 81 of the checkout counter, is a pair of pulleys 240, which are engaged by a belt 241, one end of which is attached to one end of a lever 306. The lever 306, as shown in FIG. 9, is rotatably mounted on the floor of the checkout counter, adjacent the door 230. Opening of the door 230 allows the lever 306 to be rocked clockwise (FIG. 9) by the belt 241 under the action of a pair of springs 242 (FIGS. 9 and 10), mounted between the side frame 81 and the gates 233, which results in the movement of the gates to a blocking position, as shown in FIG. 10. With this arrangement, the opening of the rear door 230 automatically positions the gates into blocking positions such that a number of stacks of cartons may be manually inserted onto the belt 222 and moved without the danger of a stack of cartons being positioned in the area normally occupied by the platform.

After the loading of the stacks of cartons has occurred, the closing of the door 230 results in the counter-clockwise rocking of the lever 306, thereby moving the gates 233 to a non-blocking position. In case the platform 112 has been emptied and has returned to its lower position before the loading of the cartons into the counter has occurred, depression of the button 231 energizes the solenoid 235 during the carton-loading operation. Energization of the solenoid 235 operates to rock the gates 233 from a blocking position to an open position, thereby allowing the stack of cartons adjacent to the platform to be moved onto the platform in the manner described previously. Thus the checkout counter and the platform are supplied with cartons to allow the carton-feeding operation to continue.

The manner in which the various buttons and switches operate in the electrical circuit, as disclosed in FIG. 13, will now be described. As shown, power is supplied over conductors 243 and 244. A carton-feeding operation is initiated by depression of the pedal 76 (FIG. 1), which operates the mechanism for feeding a carton onto the checkout counter. Operation of the pedal results in the closing of contacts 245 (FIG. 13), which completes an energizing circuit to the motor 82 over conductors 243 and 246, the normally closed contacts 247 of the switch 170, conductor 248, contacts 245, conductor 249, the normally closed contact 250, and the conductor 316 to the motor 82. Energization of the motor 82 turns the shaft 85 (FIG. 4) clockwise, which motion is transmitted to the shaft 89 by the arm 90 and the link 87. Rocking of the shaft 89 operates the scissors actuator 106 to feed a carton onto the checkout counter, as previously described.

Referring to FIGS. 7 and 8, there is shown, mounted on the sprocket wheel 214, a switch arm 271. Clockwise rotation of the sprocket wheel 214 due to the energization of the motor 82 allows the switch arm 271 to release a switch 253 (FIG. 8), whose contacts 273 (FIG. 13) now close and complete a holding circuit to the motor 82 over the conductors 243, contacts 273, conductors 254 and 316 to the motor 82. This motor-holding circuit is required, since the pedal 76, which controls the contacts 245, is released by the operator immediately after its operation, thereby opening the contacts 245, which interrupts the original motor-energizing circuit. The switch 253 (FIG. 8) is of such a type that, when the sprocket wheel 214 is in home position, the switch arm 271 engages and depresses a switch blade 272 (FIG. 8), which opens the contacts 273. As the sprocket wheel 214 completes its first revolution, the switch arm 271 is returned to its home position, thereby opening the contacts 273. It should be noted that the contacts 273 are opened only when the sprocket wheel 214 is in its home position. Opening of the contacts 273 interrupts the energizing circuit to the motor 82, which stops the rotation of the sprocket wheel 214 in the home position, as shown in FIG. 7. The mechanism is now ready for a new carton-feeding operation.

Figure 13:
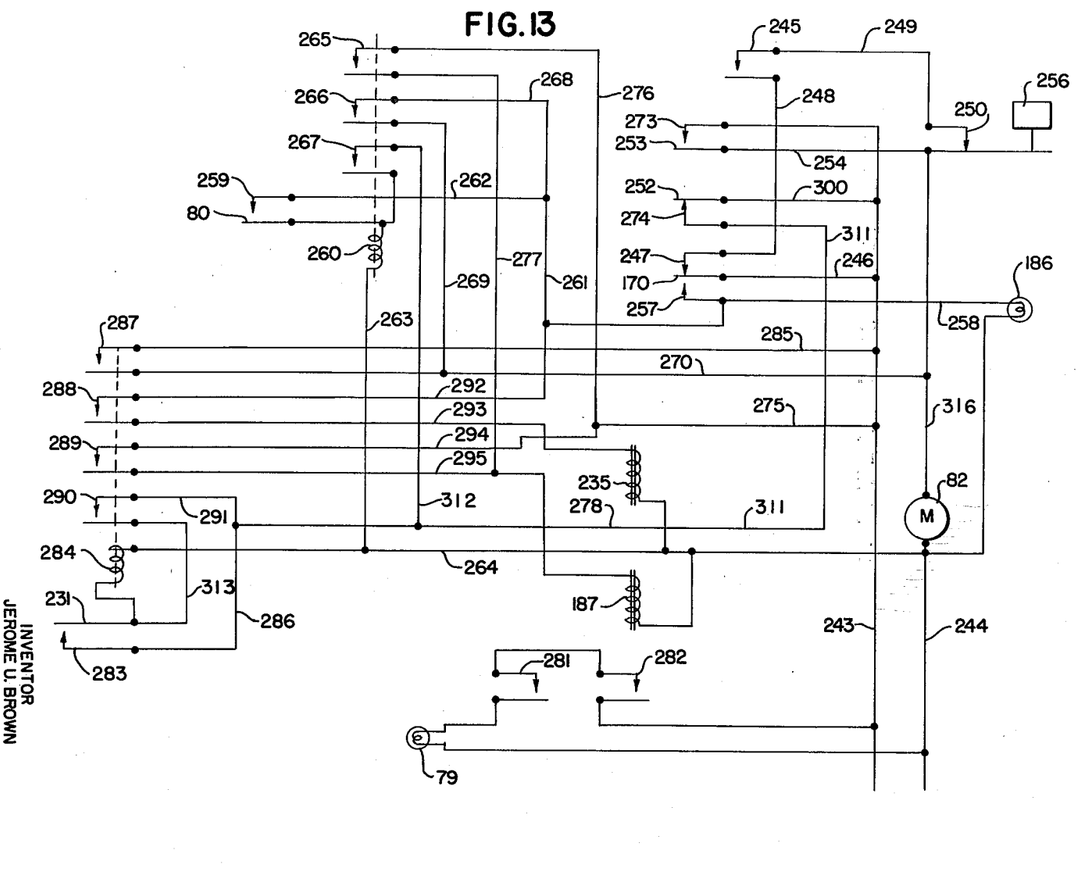
FIG. 13 is a circuit diagram of the electrical system for controlling the operation of the various drive mechanisms and the operating solenoids.

As shown in FIG. 1, there is located in the recessed portion 111 of the checkout counter a button 256, which controls the contacts 250 (FIG. 13). Whenever a carton is removed from the recessed portion 111, the button 256 closes the contacts 250, thereby conditioning the carton feed pedal 76 to operate the motor 82 as previously described. It is seen from this arrangement that, whenever a carton is on the counter, the contacts 250 are opened, which disables the operation of the carton feed pedal 76. Only when no carton is on the counter is the feed pedal 76 effective to feed a carton onto the counter. This prevents any jamming of cartons on the checkout counter.

After all the cartons have been fed from the stack and the platform is empty, the platform returns to its original position in the manner previously described. When the platform reaches its home position, the empty switch 170 (FIG. 5) is actuated by the finger 182, which operation is the result of the movement of the feeler portion 181 over the platform 112. Referring to FIG. 13, it is seen that the actuation of the switch 170 opens the contacts 247 and closes the contacts 257, thereby completing a circuit to the lamp 186 over the conductors 243, 246, now-closed contacts 257, and conductor 258 to the lamp 186. Operation of the lamp warns the operator that the platform is empty and is in condition to be loaded with a new stack of cartons. Closing of the contacts 257 also provides a source of power to one side of the stack feed button 80 (FIGS. 1 and 13). Depression of the button 80 by the operator closes contacts 259, which completes an energizing circuit to a relay 260 over the conductors 243, 246, the closed contacts 257, conductors 261, 262, the closed contact 259, the relay 260, and conductors 263 and 264 to the conductor 244. Energization of the relay 260 closes contacts 265, 266, and 267. Closing of the contacts 266 completes an energizing circuit to the motor 82 over the conductors 243, 246, the closed contacts 257, the conductors 261, 268, the closed contacts 266, and the conductors 269 and 270 to the conductor 316. Energization of the motor operates the shaft 85 and the sprocket wheel 213 (FIG. 7). Closing of the contacts 267 completes a holding circuit to the relay 260 over the conductors 243, 300, the normally closed contacts 274 of the switch 252, the conductors 311 and 312, the closed contacts 267, the relay 260, and the conductors 263 and 264 to the conductor 244. This holding circuit is necessary because the energizing circuit to the relay over the contacts 259 is opened immediately upon the operator's releasing the button 80.

The closing of the contacts 265 completes a circuit to the solenoid 187 (FIG. 7) over the conductors 243, 275, and 276, the closed contacts 265, the conductors 277 and 278, the solenoid 187, and the conductor 264 to the conductor 244. Energization of the solenoid 187 rocks the disengaging lever 190 counter-clockwise, thereby conditioning the sprocket wheel 214 to be coupled to the plate 207 and the sprocket wheel 210, as described previously. This coupling occurs at approximately 180 degrees of revolution of the shaft 85. Rocking of the lever 190 also disengages the link 87 from the arm 90, thereby preventing the operation of the shaft 89 and a carton feed operation by the motor 82.

Referring to FIGS. 7, 8, and 14, there is shown, located on the peripheral edge of the plate 207, a projection 280. Upon the coupling of the plate 207 to the sprocket wheel 214, the plate is rotated clockwise about the shaft 89 to operate the belt 222 for moving a stack of cartons onto the platform, as previously described. At 270 degrees of travel of the plate 207, the projection 280 engages a stud 304 (FIG. 8), mounted on a switch arm 298 (FIG. 14), which results in the rocking of the switch arm in a clockwise direction. The switch arm is pinned to a shaft 299 (FIGS. 8 and 14), rotatably mounted on the support member 201 (FIGS. 7 and 8). Pinned to the other end of the shaft 299 is a switch lever 251, which, upon the clockwise movement of the switch arm 298, is rocked clockwise to engage and operate the switch blade 255 of the switch 252 (FIG. 8) to open the contacts 274. The clockwise rotation of the switch lever 251 tensions a spring 301 (FIG. 14), mounted between a stud 302, secured to one end of the switch lever, and a stud 303, mounted on the support member 201. As shown in FIG. 8, the stud 302 extends beyond the support member 201, which acts as a stop to limit the length of travel of the switch lever 251.

Opening of the contacts 274 interrupts the holding circuit to the relay 260 over the contacts 267. De-energization of the relay 260 opens the contacts 265 and 266. Opening of the contacts 266 interrupts the motor-energizing circuit, while the opening of the contacts 265 interrupts the circuit to the solenoid 187. As explained previously, the de-energization of the solenoid 187 allows the ratchet pawl 202 (FIG. 7) to be disengaged from the ratchet tooth 209 when the plate 207 and the sprocket wheel 210 have traveled 90 degrees more, or one full revolution. It should also be remembered that at this point, while the plate 207 and the sprocket wheel 210 have completed 360 degrees of travel, the sprocket wheel 214 and the ratchet tooth 209 have traveled 540 degrees, or 1½ revolutions. In order to complete its cycle, the motor must remain energized. This is accomplished by the switch arm 271, which at this point is so positioned that the contacts 273 are closed, thereby supplying an energizing circuit to the motor 82. When the tooth 209 is positioned at home position, the switch arm 271 is at home position, thereby opening the contacts 273, which interrupts the energizing circuit to the motor 82.

Simultaneously with the disengagement of the ratchet pawl 202 from the tooth 209, the switch 170 trips, due to the positioning of the stack of cartons on the platform 112 (FIG. 5), which rotates the feeler portion 181 of the bell crank 180 clockwise as viewed in FIG. 5. This results in the opening of the contacts 257 and the closing of the contacts 247. Opening of the contacts 257 interrupts the circuit to the stack feed button 80 and the motor-operating circuit over the contacts 266, thereby preventing a stack feed operation whenever the platform is occupied. Closing of the contacts 247 conditions the pedal 76 to operate the carton feed mechanism to feed a carton onto the counter. Thus the checkout operation is resumed in the manner previously described.

When the last stack of cartons has been positioned on the platform 112, the button 229 (FIG. 3) is released to close the contacts 281 (FIG. 13), thereby conditioning a circuit to the low carton warning light 79 (FIG. 1), which circuit is completed upon the actuation of the switch 144 by the platform 112, as previously described. When this occurs, the contacts 282 (FIG. 13) close, and the lamp 79 lights, thereby warning the operator that a new supply of cartons is required. This is accomplished by opening the door 230 (FIG. 9), located at the front of the checkout counter. Opening of the door automatically operates the gates 233 so that they are positioned to block the stack of cartons from being fed into the area normally occupied by the platform. The operator then loads a stack of cartons onto the belt 222 and depresses the button 231 (FIG. 9), which results in the closing of contacts 283 (FIG. 13), thereby completing an energizing circuit to the relay 284 over conductors 243, 300, the closed contacts 274 of switch 252, conductors 311, 286, the closed contacts 283, the relay 284, and conductor 264 to the conductor 244. Energization of the relay 284 closes contacts 287, 288, 289, and 290.

Closing of the contact 287 provides an energizing circuit to the motor 82 over conductors 243, 285, the closed contacts 287, and the conductors 270 and 316. Closing of the contacts 290 completes a holding circuit to the relay 284 over conductors 243, 300, the normally closed contacts 274 of switch 252, conductors 311 and 291, the closed contacts 290, conductor 313, the relay 284, and conductors 264 and 244. The closing of contacts 289 completes an energizing circuit to the solenoid 187 over conductors 243, 275, 294, the closed contacts 289, conductors 295, 278, the solenoid 187, conductors 264 and 244. Energization of the solenoid 187 couples the motor drive sprocket wheel 214 to the sprocket wheel 210 for moving the belt 222 in the manner previously described. The motor 82, energized upon the closing of contacts 287, will be subsequently energized for a second revolution of travel over contacts 273, which are closed whenever the sprocket 214 is out of home position. At 90 degrees of the second revolution of the motor 82, the contacts 274 are opened, as described previously, to interrupt the holding circuit to the relay 284. The de-energization of the relay 284 at this time opens contacts 287 to 290 inclusive, resulting in the de-energization of the solenoid 187. The motor is still energized over the contacts 273, which remain closed until the sprocket wheel 214 has returned to its home position. During this operation, the stack of cartons located at the front of the counter is transported a distance equal to the length of a stack of cartons. Each time the contacts 283 are closed by depression of the button 231, the stacks of cartons are fed towards a position adjacent to the platform 112, as shown in FIG. 12. This operation is repeated until four stacks of cartons are loaded as shown.

The closing of the contacts 288 upon the energization of the relay 284 conditions an energizing circuit to the gate solenoids 235, depending on the position of the platform at the time of the operation of the relay 284. If the platform is empty and has returned to its home position, the switch 170 will have been tripped to close contacts 257 and open contacts 247. Closing of the contacts 257 provides an energizing circuit to the gate solenoids over the closed contacts 288. This circuit is completed over conductors 243, 246, the closed contacts 257, conductors 292, the closed contacts 288, conductors 293, the solenoids 235, and conductor 264 to conductor 244. Energization of the solenoids 235 moves the plungers 236 (FIG. 10) downwardly to open the closed gates 233, thereby allowing a stack of cartons to be fed onto the platform in a manner described above. Upon the de-energization of the relay 284, the contacts 288 will open, thereby de-energizing the gate solenoids 235, which results in the gates 233 (FIG. 10) returning to their closed position under the action of the springs 242. If the platform is in an upper position at the time the relay 284 is energized, the switch 170 will be in its normal position and will have its contacts 257 opened, which prevents the energization of the gate solenoids 235 upon the closing of the contacts 288. With this arrangement, a stack of cartons will be fed onto the platform only when the platform is in condition to receive a new stack of cartons.

After the stacks of cartons have been loaded into the counter, closing of the doors 230 will automatically open the gates 233, thereby allowing each stack of cartons to be subsequently moved onto the platform whenever the button 80 is depressed.

While there have been shown and described and pointed out the fundamental novel features of the invention as applied to the preferred embodiment, it will be understood that various omissions, substitutions, and changes in the form and details of the device illustrated and its operation may be made by those skilled in the art without departing from the spirit of the invention. It is the intention, therefore, to be limited only as indicated by the scope of the following claims.

What is claimed is:

1. In combination with a checkout counter having a recessed portion constituting a loading platform and having an aperture located adjacent the recessed portion and communicating with the interior of the checkout counter:
support means located within said counter and adjacent said aperture, said support means movable between a first position and a second position;
means for transporting and positioning a stack of cartons on said support means when in said first position;
means located adjacent the second position of said support means for feeding the top carton from the stack of cartons located on said support means through said aperture and onto said recessed portion of the checkout counter;
cyclic means operably connected to said support means and said feeding means for actuating said feeding means during the first half-cycle of its operation and moving said support means from said first position towards said second position during the second half of its cycle of operation whereby the top carton of said stack is positioned adjacent said feeding means; and means operated by said support means for moving the support means from said second position to said first position after the last carton has been fed from said support means onto the recessed portion of the checkout counter.

2. In combination with a checkout counter having a recessed portion constituting a loading platform and having an aperture located adjacent the recessed portion and communicating with the interior of the checkout counter:
support means located within said counter and adjacent said aperture, said support means movable between a first position and a second position;
means for transporting and positioning a stack of cartons on said support means when in said first position;
means located adjacent the second position of said support means for feeding the top carton from the stack of cartons located on said support means through said aperture and onto said recessed portion of the checkout counter;
cyclic means operably connected to said support means and said feeding means for actuating said feeding means during the first half-cycle of its operation and moving said support means from said first position towards said second position during the second half of its cycle of operation whereby the top carton of said stack is positioned adjacent said feeding means;
first means operated by said support means for moving the support means from said second position to said first position after the last carton on the support means has been fed onto the recessed portion of the checkout counter;
second means operated by said support means upon reaching said first position for conditioning said transporting means for operation;
and operator-controlled means for operating said transporting means whereby a stack of cartons is positioned on said support means.

3. In combination with a checkout counter having a recessed portion constituting a loading platform and having a slot located adjacent the recessed portion and communicating with the interior of the checkout counter:
a platform means located within said counter and adapted to be moved in a vertical direction between a first position and a second position;

means for transporting and positioning a stack of cartons on said platform means when in said first position;

means located adjacent said slot and the second position of said platform means for feeding the top carton from the stack of cartons located on said platform means through said slot and onto said recessed portion of the checkout counter;

motive power drive means adapted to operate, when energized, through one cycle of operation;

first means interconnecting said feeding means and said drive means for operating said feeding means during the first half-cycle of operation of said drive means;

second means interconnecting said platform means and said drive means for moving said platform means a predetermined distance from said first position towards said second position during the second half-cycle of operation of said drive means whereby the top carton of said stack is positioned adjacent said feeding means;

operator-controlled means for energizing said drive means;

and means operated by said support means for moving the support means from said second position to said first position after the last carton on the support means has been fed onto the recessed portion of said checkout counter.

4. The apparatus of claim 3 in which the feeding means consists of a scissors actuator having a flange portion movable, upon operation of said actuator, to a position in which said flange portion engages the top carton of said stack and said first means includes a rocking member mounted for rotation, belt means interconnecting said actuator and said rocking member, and means operated by said drive means to oscillate said rocking member.

5. The apparatus of claim 3 in which said platform means is supported by a system of chain belts; and said second means includes means for driving said chain belts, a ratchet wheel actuating said driving means, a rocking member, a ratchet pawl mounted on said rocking member and positioned adjacent said ratchet wheel, and means operated by said motive power drive means to oscillate said rocking member whereby said ratchet pawl engages said ratchet wheel during the first half of said rocking member's oscillating movement and said ratchet pawl actuates said ratchet wheel during the second half of said oscillating movement.

6. In combination with a checkout counter having a portion constituting a loading platform:

support means located adjacent said loading platform and movable between a first position and a second position;

means for transporting and positioning a stack of cartons on said support means when in said first position;

means located adjacent the second position of said support means for feeding the top carton of the stack of cartons located on said support means onto said loading platform;

motive power drive means adapted to operate through one cycle of operation;

first means interconnecting said feeding means and said drive means for operating said feeding means during the first half-cycle of operation of said drive means;

second means interconnecting said support means and said drive means for moving said support means a predetermined distance from said first position towards said second position during the second half-cycle of operation of said drive means, said second means including a ratchet wheel for controlling the movement of said support means and at least one ratchet pawl for engaging and locking said ratchet wheel in place;

and means operated by said support means when in said second position for disengaging said ratchet pawl from said ratchet wheel, thereby releasing said support means for movement from said second position to said first position.

7. In combination with a checkout counter having a portion constituting a loading platform:

means supporting a stack of cartons, said means located adjacent said loading platform and adapted for movement between a first position and a second position;

means located adjacent the second position of said supporting means for feeding the top carton from the stack of cartons located on said supporting means onto said loading platform;

cyclic means operably connected to said supporting means and said feeding means for actuating said feeding means during a first portion of its operation and controlling said supporting means for maintaining the top of the stack of cartons adjacent said feeding means during a second portion of its operation;

and means controlled by said supporting means for moving said supporting means from said second position to said first position after the last carton has been fed by said feeding means onto said loading platform.

8. In combination with a checkout counter having a recessed portion constituting a loading platform and having a slot located adjacent the recessed portion and communicating with the interior of the checkout counter:

a platform for supporting a stack of cartons, said platform being supported within said counter and movable between a first position and a second position;

movable means supporting said platform;

means for transporting and positioning a stack of cartons on said platform when in said first position;

means located adjacent the second position of said platform for feeding the top carton of the stack of cartons onto said recessed portion;

motive power drive means adapted to operate through one cycle of operation;

first means interconnecting said feeding means and said drive means for operating said feeding means during the first half-cycle of operation of said drive means;

second means interconnecting said movable supporting means and said drive means for moving said platform a predetermined distance from said first position towards said second position during the second half-cycle of operation of said drive means, said second means including a ratchet wheel for controlling the movement of said movable support means and at least one ratchet pawl for normally engaging and disabling the operation of said ratchet wheel;

means when operated for disengaging said ratchet pawl from said ratchet wheel, thereby releasing said platform for movement from said second position to said first position;

means mounted on said movable support means for conditioning said disengaging means for operation upon said platform's reaching a predetermined distance from said second position;

and means operated by said drive means after the last carton of said stack has been fed from said platform for operating said disengaging means.

9. The apparatus of claim 8 wherein said pawl is provided with a stud; and said disengaging means includes a rotatable member having a cam surface positioned adjacent said stud and said operating means includes an actuating member mounted on said rotatable member and operable, when actuated, to rock said rotatable member, thereby allowing said cam surface to engage and rock said stud.

10. The apparatus of claim 9 wherein said actuating member is conditioned for actuation during the first half-cycle of operation of said drive means and is actuated during the second half-cycle of operation of said drive means.

11. The apparatus of claim 10 which includes means for resetting said actuating member, said resetting means being actuated by said platform upon said platform's reaching said first position.

12. In combination with a checkout counter having a recessed portion constituting a loading platform and having an aperture located adjacent the recessed portion and communicating with the interior of the checkout counter:
support means located within said counter and adjacent said aperture, said support means movable between a first position and a second position;
means for transporting and positioning a stack of cartons on said support means when in said first position;
means located adjacent the second position of said support means for feeding the top carton of the stack of cartons located on said support means through said aperture and onto said recessed portion;
drive means adapted to operate through one cycle of operation;
first means interconnecting said drive means with said support means and said feeding means for operating said feeding means during the first half-cycle of operation of said drive means and moving said support means a predetermined distance from said first position towards said second position during the second half-cycle of operation of said drive means whereby the top carton of said stack is positioned adjacent said feeding means;
second means, when actuated, for interconnecting said drive means with said transporting means;
means actuated by said support means when in said second position for moving the support means from said second position to said first position;
means when operated for disabling said first means and actuating said second means;
other means operated by said support means upon reaching said first position for conditioning said disabling means for operation;
and operator-controlled means for operating said disabling means and said drive means whereby said drive means operates said transporting means to position a stack of cartons on said support means.

13. The apparatus of claim 12 wherein said disabling means includes a solenoid; and said other means includes an electrical circuit in which the solenoid is located, a switch which when actuated conditions an energizing circuit to said solenoid, and a rotatable member positioned adjacent the first position and rotated by said support means when in said first position for actuating said switch.

14. The apparatus of claim 13 wherein said rotatable member has a sensing portion which, upon rotation of said member, is positioned to sense the presence or absence of a stack of cartons on said support means for controlling the rotation of said member.

15. The apparatus of claim 13 wherein said second means includes means for driving said transporting means; means driven by said drive means; and means, when actuated, for coupling said driven means to said driving means, said coupling means being actuated upon energization of said solenoid.

16. In combination with a checkout counter having a recessed portion constituting a loading platform and having an aperture located adjacent the recessed portion and communicating with the interior of the checkout counter:
a platform for supporting a stack of cartons, said platform being supported within said counter and movable between a first position and a second position;
movable means supporting said platform;
a conveyor mounted adjacent the first position of said platform and adapted for transporting and positioning a stack of cartons on said platform;
means located adjacent the second position of said platform for feeding the top carton of the stack of cartons onto said recessed portion;
motive power drive means including a power source and a member attached to said source and driven thereby, said power source adapted to operate, when actuated, through one cycle of operation;
first means interconnecting said feeding means and said driven member for operating said feeding means during the first half-cycle of operation of said power source;
second means interconnecting said movable supporting means and said driven member for moving said platform a predetermined distance from said first position towards said second position during the second half-cycle of operation of said power source, said second means including a ratchet wheel for controlling the movement of said movable support means and at least one ratchet pawl for normally engaging and disabling the operation of said ratchet wheel;
third means, when actuated, for interconnecting said power source with said conveyor, thereby operating said conveyor upon operation of said power source;
first means when operated for disengaging said ratchet pawl from said ratchet wheel, thereby releasing said platform for movement from said second position to said first position;
means mounted on said movable support means for conditioning said first disengaging means for operation upon said platform's reaching a predetermined distance from said second position;
means operated by said drive means after the last carton has been fed from said platform for operating said first disengaging means;
second means when operated for disengaging said driven member from said first and second interconnecting means and actuating said third means;
other means operated by said platform upon reaching said first position for conditioning said second disengaging means for operation;
and operator-controlled means for operating said second disengaging means and said drive means whereby said drive means operates said conveyor to position a stack of cartons on said platform.

References Cited in the file of this patent

UNITED STATES PATENTS

| | | |
|---|---|---|
| 1,889,109 | Richardson | Nov. 29, 1932 |
| 2,585,872 | Steiner | Feb. 12, 1952 |
| 2,909,020 | Mersky | Oct. 20, 1959 |
| 3,025,651 | Stanley | Mar. 20, 1962 |